UNDERWATER LOW TEMPERATURE SEPARATION UNIT

Original Filed May 17, 1966 2 Sheets-Sheet 1

JOHN R. LEONARD
INVENTOR

BY Alan G. Paul

ATTORNEY

UNDERWATER LOW TEMPERATURE SEPARATION UNIT

Original Filed May 17, 1966 2 Sheets-Sheet 2

JOHN R. LEONARD
INVENTOR

BY Alan G. Paul

ATTORNEY

United States Patent Office

Re. 27,308
Reissued Mar. 14, 1972

27,308
UNDERWATER LOW TEMPERATURE SEPARATION UNIT

John R. Leonard, Houston, Tex., assignor to Mobil Oil Corporation

Original No. 3,384,169, dated May 21, 1968, Ser. No. 550,705, May 17, 1966. Application for reissue Apr. 8, 1970, Ser. No. 26,477
Int. Cl. E21b *43/01, 39/00*
U.S. Cl. 166—.5 18 Claims

Matter enclosed in heavy brackets [ ] appears in the original patent but forms no part of this reissue specification; matter printed in italics indicates the additions made bv reissue.

*ABSTRACT OF THE DISCLOSURE*

*An apparatus involving an underwater separator assembly comprising a landing base and a removable separator which mates therewith. The base is adapted to be affixed to the marine bottom and be connected through a first flowline means to a producing well and through one or more additional flowlines to production facilities. The separator which has an inlet adapted to be releasably connected to said first flowline and one or more outlets adapted to be releasably coupled to said additional flowlines, respectively, is lowered on guide means to the base and is mated therewith.*

Figure 1:
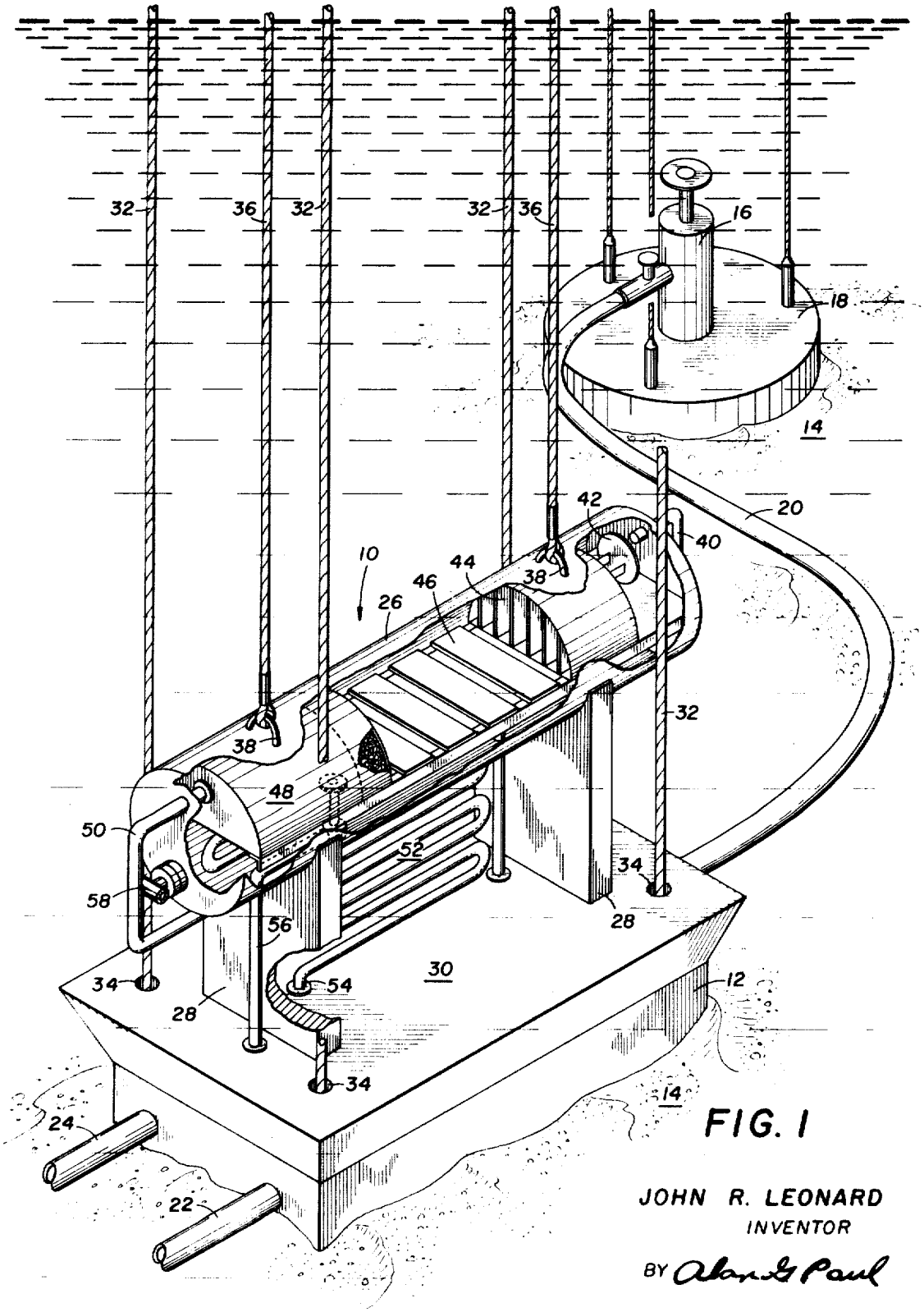

This invention relates to a method and apparatus for relieving the high produced pressure of a natural gas stream adjacent a subaqueous well site while minimizing the formation of hydrates therefrom, and more particularly to improvements in a low temperature separation unit to be situated on the marine bottom adjacent a subaqueous well.

In the development of offshore gas fields where high pressure natural gas wells are present, the formation of hydrates in the flowlines from the subaqueous wells to the central production facilities becomes a constant maintenance problem. The water present in the high pressure gas tends to form the hydrates as the temperature of the gas is lowered, by heat, transfer, as will naturally occur in a subsea installation where the natural gas is often produced at 170–180° F. and must be transported relatively long distances, to central production facilities, by flowlines laid on the marine bottom. The ambient temperature of the surrounding water varies from 59°–69° F. in the producing areas of the Gulf of Mexico and may reach as low as 32°–33° F. in Arctic regions and very deep bodies of water. The higher the initial pressure of the natural gas, the more the problem is enhanced.

Another problem associated with high pressure natural gas wells is that of reducing the pressure of the natural gas so that it may be introduced into a central pipeline. For example, a large number of the gas wells drilled in the Gulf of Mexico have encountered pressures that range from 3,000 to 6,000 p.s.i.a. The central pipelines usually have a maximum allowable pressure of about 1,000 p.s.i.a. This means that a large pressure drop must be taken somewhere along the gas line. If the gas is merely expanded through a low temperature separator, the residual water in the expanded gas will form hydrates at the resultant low temperature of the gas, caused by the expansion, before the gas has been sufficiently warmed by heat transfer from the surrounding warm water.

It would be advantageous if a low temperature separator unit could be erected at the site of each natural gas well or centrally located among a group of closely spaced subaqueous wells to drop the gas pressure and remove the hydrates almost immediately. Heat exchange means would also be needed in such a separator unit for melting the produced hydrates in the expansion chamber and also for subsequently quickly heating the resultant cold expanded gas, after leaving the expansion chamber, to prevent the formation of residual hydrates in the flowline between the separator unit and the central production facilities. Hydrates tend to form in the flowline, due to a time lag in their formation after expansion, and the pressure drop incurred in along flowline. The more complex problem is that of warming the cold expanded gas. This heat energy is usually obtained on surface installations by burning some of the produced gas and circulating water heated therefrom. Such an on-site, low temperature separator unit must be rather inexpensive if one is to be at the site of each gas well and still provide competitively priced gas. If it is necessary to have a rather sophisticated heat exchanger and a bottom-supported above-surface platform for such apparatus, the cost would probably be too high to be feasible. Moreover, the separation unit, if located above the surface, would then be subject to the numerous violent storms that so frequently sweep the offshore areas. Furthermore, the rapidly increasing number of above-surface structures in the gulf is a constant source of danger to shipping, and vice versa.

Therefore, if it were practical, it would be desirable to set a separator unit on the floor of the ocean adjacent a subaqueous well. However, several problems arise when this is contemplated. One of these is the problem of servicing and maintaining of the unit. A diver may be used for certain of the repairs for maintenance operations; however, even in shallow water his effectiveness is less than that of a man working under atmospheric conditions. While robotic and TFL (through flowline) tools have been developed and are available for routine servicing and maintenance operations, these devices are complicated and expensive, and are at this time only used for a few limited tasks.

Furthermore, it is not practical to maintain a heat energy source, such as burning gas, beneath the surface of the water. Such a heat source would entail a continuous surface connection for supplying air and almost continuous surveillance of the unit. The number of necessary or required safeguards and controls would rise exponentially.

Therefore, it is an aspect of the present invention to provide a submersible low temperature separation unit designed to be easily brought back to the surface for maintenance and repairs.

Another aspect of the invention is to provide heat exchange means for the gas output of a low temperature separator unit utilizing the higher ambient temperature of a surrounding body of water.

Figure 2:
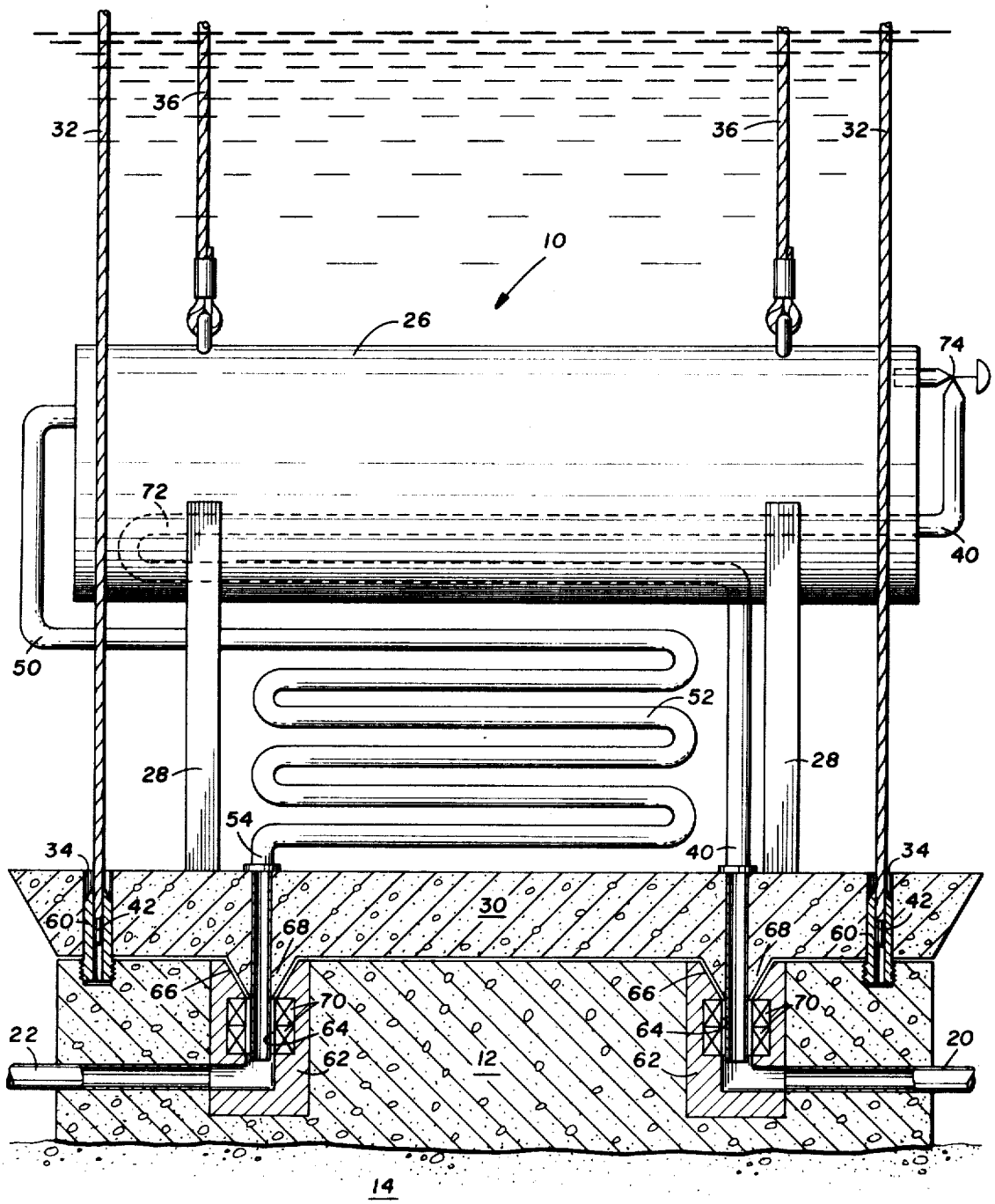

Other aspects and advantages of this invention will be apparent from the following description taken with reference to the accompanying drawings, wherein is shown a preferred embodiment of the invention:

FIGURE 1 is a pictorial representation of the low temperature separation unit of the present invention, partially broken away, fixed on the marine bottom adjacent a production wellhead; and FIGURE 2 is a schematic elevational view of the separation unit showing the interrelationship of the various gas conduits to obtain the proper heat exchange.

Now referring to FIGURE 1, a separator unit, generally designated 10, is shown mounted on a landing base 12 on a marine bottom 14 adjacent a subaqueous well capped with a production subsurface wellhead 16 set in a landing base 18. A production flowline 20 directs the produced natural gas to the landing base 12 of the separator unit 10. A gas flowline or shipping line 22 and an oil flowline or shipping line 24 extend from the separator unit 10 to transport the produced fluids to central production facilities, such as a storage tank or a main trunk central pipeline (not shown). The separator unit 10 consists of an elongated cylindrical shell 26, with its axis horizontally oriented, mounted by means of spaced legs 28 on a base or ballast section 30. This unit is detachably connected to the landing base 12, which has flexible guidelines 32 extending up through guide passages 34 formed in the base section 30. A pair of cables 36 are connected by padeyes 38 to the shell 26 of the separator unit 10 so that the unit may be detached from the base 12 and brought to the surface by a floating vessel (not shown).

The interior of the separator shell 26, as shown in FIGURE 1, is conventional, having an inlet conduit 40 thereof connected upstream, as will later be described, with the production flowline 20. The natural gas is injected, through the downstream end of the inlet conduit 40, into the shell 26, against a dish deflector 42 and then flows through straightening vanes 44 and across divider plates 46 and into a mist extractor section 48. The cold expanded gas now, cleansed of most of the included oil and heavy, hydrocarbons, and the major portion of the water, is drawn off through an outlet conduit 50, protruding from the downstream end of the separator shell 26. The downstream end of conduit 50 is connected to a bank of heat exchangers 52 nested in a protective area beneath the separator shell 26 on the base section 30. The gas exits from the tortuous tubing path of the heat exchanger by a vertically depending conduit portion 54, down through the base section 30, wherein it is connected, as will later be described, to the flowline 22. Beneath the divider plates 46 in the separator shell 26 is a sump section for collecting the liquid and solid impurity constituents of the gas condensate mixture. The oil and water generally separate in the sump and the oil is carried off through on oil outlet conduit 56 vertically depending into the base section 30 through which it is connected to the flowline 24 in the same manner that the gas outlet conduit 54 is connected to the flowline 22. If it is not economical to lay a flowline for the separated oil, the oil flowline 24 would be omitted and the oil would be removed with the resultant water. A dump port 58, controlled by a conventional internal float valve (not shown), is used to bleed off the water and other impurities collected below the oil in the sump. Depending upon the water pressure and various Coast Guard regulations, these impurities may be either directly dumped into the body of water surrounding the separator or may instead be transported by a connected line to a waste storage tank of a workboat on the surface, or a central production platform.

Although a horizontal separator unit 10 of a particular design is shown and described, this is only for purposes of illustrating a preferred embodiment. The horizontal separator is especially adaptable to be used as a part of this invention because of its extended sump section as will be explained with reference to FIGURE 2. Actually, almost any type of low temperature separator designed for subsea use, such as a vertical or spherical separator, can be used. The particular elements in the separator are not a portion of this invention. Although the type of separator shown with multiple vanes and divider plates and a mist extractor is a very efficient design, it may be that practical considerations will dictate that an open unobstructed expansion chamber be used so that there will be no elements above the sump to collect deposits of hydrates. Such separators can be found in the Composite Catalog of Oil Field Equipment and Services, published by World Oil, a Gulf Publishing Company Publication (1965), as evidenced for example, on pages 645–647.

FIGURE 2 shows the schematic arrangement of the gas conduits in the separator unit necessary to effect the desired exchanges of heat, and the apparatus for detachably uniting the separator unit 10 to the landing base 12.

The base section 30 of the separator unit 10 is guided into position on the landing base 12 by the guideline cables 32 which are entrained through the vertical guide passages 34. The guideline cables 32 are anchored in upstanding guide pins 50 fixed in the upper surface of the landing base 12 to locate the separator unit base 30. Three stab-in connections 62 (only two shown in FIGURE 2) are provided in the landing base 12, in the preferred embodiment, the lower end of each of these stab-in connections being in fluid communication with a respective flowline or shipping line to provide transportation for the produced effluent from the wells 16 to the central production facilities. The stab-in connections 62 each have a vertical passageway 64 for accepting a depending conduit portion which extends through the base of the low temperature separator unit 10. At the upper end of each of the stab-in connections, a depending conical face 66 is formed to coact with a reverse conically shaped centering means 68 on the lower face of the base 30. Circumferential packing elements 70 are set in the stab-in connections to seal these connections after the depending conduits 40 and 54 (also conduit 56 which is not shown in this figure) are stabbed thereinto as shown in FIGURE 2.

The natural gas flowing into the separator shell 26 from the well 16 through the flowline 20 is guided up through the respective stab-in connection and conduit portion 40 entering the shell 26 of the unit 10 through the bottom thereof and forming a tortuous path of at least one loop of tubing 72 prior to exiting from the shell 26 to be injected thereinto through a choke 74 in the inlet conduit 40 just outside the shell 26. The purpose of the loops 72, within the shell 26, is to melt the hydrates within the sump portion of the shell 26 so they will flow out. If a spherical separator is utilized, the heating loop within the sump would take the shape of a spiral coil.

Subsequent to the natural gas being expanded and separated, it is removed through the outlet conduit 50 of the separator unit 10 and passes into the heat exchanger 52 prior to flowing out through the shipping line 22. Although in this view the heat exchanger is shown merely as a planar series of loops, it may be in fact a number of parallel loops stacked one behind the other, or any other type of conventional heat exchanger which would permit the surrounding warmer water to flow between the coils. Within the coils of the exchanger 52 the gas is quickly heated to the ambient temperature of the surrounding water.

This installation has been primarily designed with the Gulf of Mexico in mind where the water is quite warm the year round. However, the unit may be used anywhere that the ambient water temperature is high enough to heat up the separated gas to reduce the hydrate problem. In some areas such a separator might only be used for a portion of the year in which the water would be warm enough. With such an installation, it is contemplated that depth would not be a particular problem. The wellhead itself being rather simple and having only a few valves thereon to be actuated could be controlled from the surface by various methods, for example, by connecting the valves temporarily to a drill pipe lowered from a surface vessel as taught in the Postlewaite Patent 3,225,826. Such a method might also be used to close off the lines 20, 22, and 24 prior to raising the separator unit 10 back to the surface before maintenance and repair. The shut-off valves can be mounted on the wellhead and at the central facilities or they may be adjacent the landing base 12 which would seem to be preferable. In actuality, valves would probably be mounted at both ends for safety.

Although the present invention has been described in connection with details of the specific embodiment thereof, it is to be understood that such details are not intended to limit the scope of the invention. The terms and expressions employed are used in a descriptive and not a limiting sense and there is no intention of excluding such equivalents in the invention described as fall within the scope of the claims. Now having described the apparatus herein disclosed, reference should be had to the claims which follow.

What is claimed is:

1. A separator unit adapted to be mounted beneath the surface of a body of water, said separator unit comprising: an expansion chamber; a first conduit means for directing a high pressure natural gas into said expansion chamber; a second conduit means for drawing off cold expanded, and separated, gas from said chamber; and a heat exchange means in series with said second conduit means, said heat exchange means being a tortuous path for said cold expanded gas substantially adjacent said expansion chamber, said tortuous path being arranged so that the surrounding water of the body of water in which said separator will be submerged can flow freely in close proximity to said expanded gas whereby said cold expanded gas is warmed by the relatively warm water of said body of water to prevent the formation of further hydrates in said cold expanded gas in flowlines connecting said separator unit with central facilities.

2. The separator unit of claim 1 wherein said tortuous path of said heat exchanger comprises a plurality of closely spaced loops of heat conducting tubes between which the surrounding water can freely flow.

3. The separator unit of claim 1 wherein said first conduit forms a tortuous path within said expansion chamber prior to the termination of said first conduit at an inlet to said expansion chamber, and the resultant release of said natural gas within said expansion chamber, whereby the relatively hot natural gas from a subaqueous well melts hydrates formed within said expansion chamber.

4. The separator unit of claim 3 wherein there is a liquid sump in said expansion chamber, and wherein said tortuous path in said first conduit is formed in said liquid sump.

5. The separator unit of claim 4 wherein said expansion chamber of said separator unit is of a substantially cylindrical configuration with the axis of said cylinder being horizontally oriented whereby an elongated sump is provided for heat exchange.

6. A separator landing base to be fixed permanently beneath the surface of a body of water on the marine bottom for removably mounting a separator unit and operatively fluidly connecting said separator unit between a wellhead of a subaqueous well and production facilities; a plurality of vertically oriented stab-in fluid connections in said landing base; a first flowline means for connecting a first of said stab-in connections with a production wellhead of a subaqueous well adjacent said landing base; and a second flowline means for connecting a second of said stab-in connections with production facilities at a distant point.

7. A separator landing base as recited in claim 6 wherein there is at least one guide means attached to said separator base at a fixed end of said guide means and adapted to be attached at a free end to a point above the surface of a body of water for remotely guiding said separator unit into an operative relationship with said landing base whereby said separator unit can be installed and retrieved without a diver.

8. A separator unit adapted to be mounted removably beneath the surface of said body of water on said separator landing base as recited in claim 6 wherein said separator unit consists of a submersible separator mounted on a base section; a first conduit means for directing a gas condensate from an adjacent production wellhead into an inlet of said separator, said first conduit means having a vertical portion at the upstream end thereof depending through said base section to unite with said first stab-in connection in said landing base to form a fluidtight connection therewith; and a second conduit means for drawing a separated and expanded gas from said separator, said second conduit means having a vertical portion at the downstream end thereof depending through said base section to unite with said second stab-in connection in said landing base to form a fluidtight connection therewith.

9. The separator unit of claim 8 wherein said first conduit means comprises a heat exchange portion within an expansion chamber portion of said separator, said heat exchange means being between said upstream end of said first conduit means and a second end of first conduit means at which said natural gas is injected into said expansion chamber to be expanded and separated whereby said natural gas in said first conduit, as received from an adjacent subaqueous well, melts the hydrates formed in said expansion chamber; and wherein said second conduit means consists of a heat exchange means between said downstream end of said second conduit and an upstream end of said first conduit at which said expanded and separated gas is drawn off from said expansion chamber, said heat exchange means consisting of loops of tubing directly immersed in said body of water whereby said cold expanded gas is warmed by the relatively warm water of said body of water prior to said gas being transported to production facilities through said second flowline means, whereby hydrate formation in said second flowline means is reduced.

10. The separator unit of claim 9 wherein said base section comprises means for continuously engaging said guide means of said landing base as said separator is lowered to the landing base from the surface of said body of water.

*11. A separator landing base to be fixed permanently beneath the surface of a body of water on the marine bottom for removably mounting a separator unit and operatively fluidly connecting said separator unit between a wellhead of a subaqueous well and production facilities; a plurality of releasable, fluid connecting means affixed to said base and having one end thereof connected to a first of said releasable connecting means and the other end thereof adapted to be fluidly connected with a production wellhead of a subaqueous well; a second flowline means affixed to said base and having one end thereof connected to a second of said releasable connections and the other end thereof adapted to be fluidly connected with production facilities located at a distant point; and a third flowline means affixed to said base having one end thereof connected to a third of said releasable connections and the other end thereof adapted to be separately fluidly connected with production facilities located at a distant point.*

*12. A separator unit adapted to be mounted removably beneath the surface of said body of water on said separator landing base as recited in claim 11 wherein said separator unit comprises:*

*a support means;*

*a separator mounted on said support means, said separator having an inlet and a plurality of outlets;*

*a first conduit connected at one end to said inlet of said separator and having a means on the other end thereof adapted to mate with said first connecting means on said landing base to form a fluidtight connection therewith;*

*a second conduit connected at one end to one of said plurality of outlets of said separator and having means on the other end thereof adapted to mate with said second connecting means on said landing base to form a fluidtight connection therewith; and*

*a third conduit connected at one end to another of said outlets of said separator and having means on the other end thereof adapted to mate with said third connecting means on said landing base to form a fluidtight connection therewith.*

*13. A separator unit as recited in claim 12 wherein said separator is a liquid-gas separator and wherein:*

*said one of said plurality of outlets is for removing liquid from said separator; and*

*said another of said plurality of outlets is for removing gas from said separator.*

*14. A separator unit as recited in claim 13 including: heat exchange means operably associated with said third conduit to warm gas as it exits said separator through said another of said outlets.*

*15. A subsea separator assembly comprising:*

*a landing base adapted to be fixed permanently beneath the surface of a body of water on the marine bottom;*

*a plurality of releasable, fluid connecting means affixed to said landing base;*

*a first flowline means affixed to said landing base, one end of said first flowline means being connected to a first of said connecting means and the other end thereof adapted to be fluidly connected with a production wellhead of a subaqueous well;*

*a second flowline means affixed to said landing base, one end of said first flowline means being connected to a second of said connecting means and the other end thereof adapted to be fluidly connected with production facilities located at a distant point;*

*a third flowline means affixed to said base having one end thereof connected to a third of said releasable connections and the other end thereof adapted to be separately fluidly connected with production facilities at a distant point;*

*a separator unit having an inlet and a plurality of outlets;*

*a first conduit connected at one end to said inlet and having means on the other end thereof adapted to mate with said first connecting means on said landing base to form a fluidtight connection therewith; and*

*a second conduit connected at one end to one of said plurality of outlets of said separator and having means on the other end adapted to mate with said second connecting means on said landing base to form a fluidtight connection therewith; and*

*a third conduit connected at one end to another of said outlets of said separator and having means on the other end thereof adapted to mate with said third connecting means on said landing base to form a fluidtight connection therewith.*

*16. A subsea separator assembly as recited in claim 15 including: guide means between said landing base and said separator for guiding said separator onto said base once said base has been fixed on the marine bottom.*

*17. A subsea separator assembly as recited in claim 15 wherein said separator is a liquid-gas separator and wherein:*

*said one of said plurality of outlets is for removing liquid from said separator; and*

*said another of said plurality of outlets is for removing gas from said separator.*

*18. A subsea separator assembly as recited in claim 15 including: heat exchange means operably associated with said third conduit to warm gas as it exits said separator through said another of said outlets.*

References Cited

The following references, cited by the Examiner, are of record in the patented file of this patent or the original patent.

UNITED STATES PATENTS

| | | | |
|---|---|---|---|
| 2,748,884 | 6/1956 | Erwin | 175—206 X |
| 2,990,796 | 7/1961 | Cole et al. | 114—0.5 |
| 3,292,695 | 12/1966 | Haeber | 166—.5 |
| 3,299,950 | 1/1967 | Shatto | 166—.5 |
| 3,353,364 | 11/1967 | Blanding et al. | 175—6 X |
| 3,363,683 | 1/1968 | Corley | 166—.5 |
| 3,366,173 | 1/1968 | McIntosh | 166—.5 |
| 3,401,746 | 9/1968 | Stevens et al. | 166—.5 |

MARVIN A. CHAMPION, Primary Examiner

R. E. FAVREAU, Assistant Examiner

U.S. Cl. X.R.

166—267

UNITED STATES PATENT OFFICE
CERTIFICATE OF CORRECTION

Patent No. Re. 27,308 Dated March 14, 1972

Inventor(s) John R. Leonard

It is certified that error appears in the above-identified patent and that said Letters Patent are hereby corrected as shown below:

Column 2, ln. 40, "en-" should be deleted.
Column 4, ln. 5, "50" should be --60--.
Column 6, ln. 39, after "said" --landing base; a first flowline means affixed to said-- should be inserted.

Signed and sealed this 18th day of July 1972.

(SEAL)
Attest:

EDWARD M.FLETCHER,JR.
Attesting Officer

ROBERT GOTTSCHALK
Commissioner of Patents

USCOMM-DC 60376-P69
☆ U.S. GOVERNMENT PRINTING OFFICE : 1969 O—366-334